(No Model.)
C. A. HOXSIE.
ARTIFICIAL FISH POND.
No. 518,318. Patented Apr. 17, 1894.
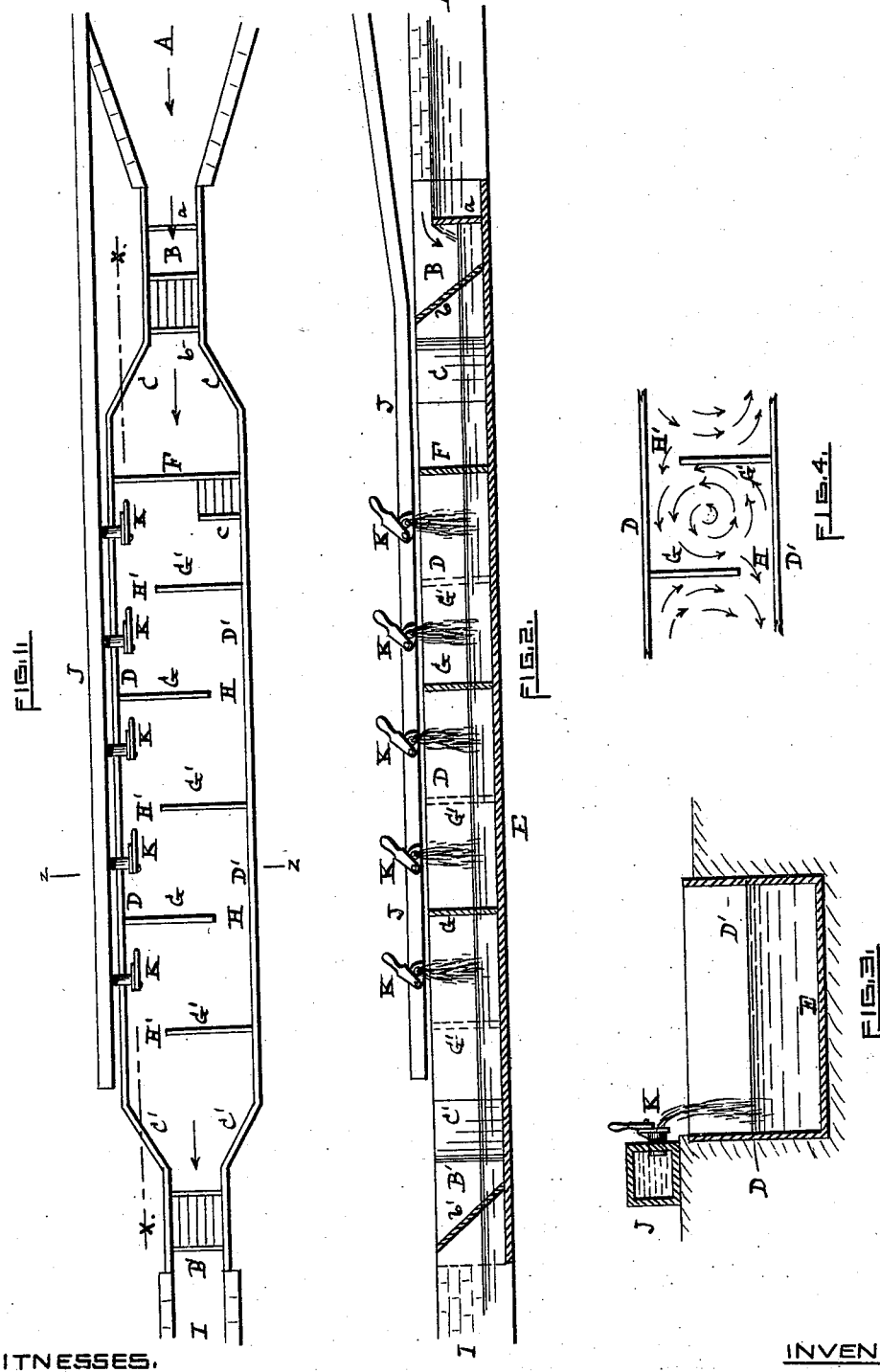
WITNESSES.
INVENTOR.
Charles A. Hoxsie

UNITED STATES PATENT OFFICE.

CHARLES A. HOXSIE, OF RICHMOND, RHODE ISLAND.

ARTIFICIAL FISH-POND.

SPECIFICATION forming part of Letters Patent No. 518,318, dated April 17, 1894.

Application filed July 16, 1890. Serial No. 358,960. (No model.)

*To all whom it may concern:*

Be it known that I, CHARLES A. HOXSIE, of the town of Richmond, in the county of Washington, in the State of Rhode Island, have invented a certain new and useful Improvement in Artificial Fish-Ponds; and I declare the following to be a specification thereof, reference being had to the accompanying drawings.

Like letters indicate like parts.

Figure 1 is a top plan of my invention. Fig. 2 is a view of the same, partly in side elevation and partly in vertical section on line $xx$ of Fig. 1. Fig. 3 is an enlarged transverse section on line $zz$ of Fig. 1, showing the gate, however, in side elevation. Fig. 4 illustrates in top plan, the currents of water in the compartments of my artificial pond.

In the culture of fish in artificial ponds, as hitherto practiced, it has been common to construct a straight pond with parallel sides, through which the stream flows in a direct current, and to place screens at each end to allow the water to pass through, but to prevent the escape of the fishes. The artificial pond, when so made, is practically a sluiceway, without means for aerating the water, or changing the direction of the current, or the force of the stream. Fishes placed in such a pond are subjected to unnatural conditions and a large proportion of them die in consequence. It is found by experience that the fishes in such artificial ponds habitually head up the stream and congregate mostly at the upper end of the pond and are obliged to struggle, day and night, against the power of the current or are forced down the stream, if they cease their efforts, and crowded against the lower screen, where they die from exhaustion. This mortality is so great and constant as to almost destroy the profit in fish culture and those fishes, which, by reason of superior strength, are able to survive such severe conditions of life, are apt to have enlarged heads, which fact, I have discovered, is due to the lack of sufficient air in the water, causing an increased and unnatural action of the gills in breathing. The fishes seek the upper part of such ponds, principally in the effort to get air, as the water in passing through the upper screen, especially if there is a fall at or near that point, is better aerated there than in the smooth, uniform currents below.

Another disadvantage in the use of straight ponds is that the excrement, offal and waste food are diffused through the water and at last settle as a sediment on the bottom of the pond, thus fouling the water. Especially is this true when the food is thrown into the water in bulk.

In fish culture it is of prime importance that all conditions and the environment be made as nearly like the natural state as possible. The stream should be diversified, offering in some places a swift current, in others a sluggish current and places for rest and refuge; the stream should be so broken up by falls or otherwise as to thoroughly incorporate air in the water, for it is a well-known fact, but one practically ignored by fish-culturists, that fishes, though living in water, breathe air, this air being in bubbles, large and small, held in suspense throughout the mass of the water; the food should be delicately served in small quantities and in a tempting manner and there should be suitable shadow and sunshine upon the stream. Such favorable conditions will prevent the great mortality of the fishes, especially if there has been proper care in the selection of the spawn and its impregnation. If fishes are born of fully matured spawn and milt, they will grow and thrive, even in artificial ponds, just in proportion as the natural conditions of fish life are observed and regarded. In my present application I show means for securing said natural conditions with regard to the suitable aeration of the water and the diversification of the water currents to change the force thereof at different places and also to keep the water pure. Other devices in relation to feeding the fishes, &c., will be the subject-matter of other applications.

My invention relates to artificial ponds adapted for the raising and culture of trout and other kinds of fish, and consists in constructing the pond with a number of cross partitions with water-ways or openings, arranged alternately on opposite sides, for the purpose of deflecting the currents of the water or stream, and a feed pipe conducting water, (under pressure,) and provided with gates, opening therefrom at intervals and adapted to discharge jets of water from said feed pipe into the compartments of said artificial pond with sufficient force to penetrate the water of the compartment to a considerable depth and to carry down with said jets a quantity of air enough to properly aerate the water in said compartments.

In the drawings A represents a reservoir of water fed by a spring or by a suitable stream or brook.

B is the narrow inlet of the pond.

$a$ is the flash-board of a dam, over which the water falls, and $b$ is a rack or screen, (preferably set at an angle, as shown,) to strain the water in passing to free it of sticks, leaves and foreign substances.

C C are inclining sides extending from the inlet B to widen the pond. The pond proper is formed with parallel sides D D′ and a bottom E, made of plank, stone or other suitable material. Gravel or sand is spread over the bottom to give a proper bed to the stream.

A partition F extends across the pond from side to side and is provided with a strainer or rack $c$, (preferably set at an angle, as shown.) Partitions G extend at right angles from the side D, leaving an opening or water way H between the inner end and the opposite side D′; and similar partitions G′ extend at right angles from the side D′ leaving an opening or water way H′ between their inner ends and the opposite side D. By this arrangement the pond is divided into square compartments, having water ways alternately located as shown in Fig. 1, for the flow of the stream through the pond.

At the lower end of the pond are the inclined sides $c'$ $c'$, the narrower outlet B′ with parallel sides and the screen $b'$, (preferably set at an angle as shown.)

I indicates the waste way of the pond, made of masonry, or otherwise.

J is a feed pipe, which is located along the side D of the pond, parallel therewith, but in a plane higher than the top of the side D. This pipe J leads from a reservoir or head of water elevated in a plane sufficiently above the level of said pipe to enable the discharge of the water therefrom under pressure. Water gates or valves K open from said feed pipe and are so situated as to discharge water into each of said compartments of the pond.

The water from the reservoir A flows naturally into the inlet channel B of the artificial pond, falls over the flash-board $a$, as shown in Fig. 2, and passes down the pond, through the screens or racks $b$ $c$, into the first compartment. It flows thence, through the opening or water way H′, into the second compartment and thence, through the water way H into the third compartment, and so on through the whole length of the pond, passing out through the channel C′ C′ and rack $b'$, into the outlet B′ and the waste way I.

The course of the water in each compartment is illustrated in Fig. 4, in which the arrows indicate the direction of the currents. The water passing through the opening H′ is seen flowing toward and against the partition G, where it is deflected toward the side D′, thus giving a curve to the current. At the opening H a portion of the water flows through into the next compartment, but the remainder is deflected by the side D′ and is carried around toward the partition G′ and again toward the side D. A centripetal current is thus created, as shown in said figure. The result of these centripetal currents is to collect at their vortex, in the center of each compartment, respectively, all the excrement, waste food and other solid substances in a little heap or mass, thus keeping the body of the water pure and enabling the easy removal of such substances by a scoop, pump, or otherwise. I thus diversify the currents of the water and their force, so as to give swiftness and directness in some places, eddies in others and quiet retreats in others, so that the fishes can find and select their natural environments of activity or rest, instead of suffering a continuous, lifelong struggle against the direct, uniform and relentless flow of a stream through a long, straight pond or raceway.

The fishes, instead of habitually huddling close to the inlet of the pond and heading up the stream, as is commonly seen in the usual artificial ponds, are, in my improved pond, distributed throughout the water in a natural manner and float or swim in all directions, at will, with perfect ease and freedom. I also secure the cleanliness of the water by the natural scouring action of the centripetal currents upon the bed of the stream and by the massing of the filth or refuse in certain limited localities can frequently remove it.

The water which flows through the feed pipe J comes from another reservoir or head of water and is discharged under pressure through the gates K into the compartments in a direction substantially at a right angle to the sides of the pond. The gates or valves K should be so constructed as to discharge the water in fan-shaped or considerably spread jets. The purpose of this additional water-supply is two-fold. First, the water of the reservoir A, fed by springs or a brook, will be of a certain temperature, as for example, quite cold, and the water of the other reservoir may be comparatively warmer. By regulating the flow of the water through the pipe and gates J, K, the temperature of the water in the fish-pond may be brought to any desirable degree, as circumstances may require. But the second and very important result so secured is the aeration of the water in the pond. Hitherto no provision has been made in ponds for fish-culture to give the requisite air supply and this has been the principal cause of the great mortality among fishes so confined. Under natural conditions there are irregularities in the conformation of the banks and bed of a stream or brook and rocks or other obstructions to the current to break up the water sufficiently to permit its aeration to the extent necessary to support aquatic life; but in a long, straight pond, such as are used by fish-growers, there is nothing to diversify the stream or to force air into the water. I accomplish this result by means of the jets of water streaming from the gates K and flowing, preferably with some degree of pressure, into the waters of the pond. Such jets striking forcibly upon the water of the pond enter into it to a considerable depth and carry down with them into the water a large amount of air, as is evidenced by the foam and great number of bubbles. The whirling currents or eddies, formed in the compartments, give the air bubbles a rotary and spiral course, thus disseminating the air throughout the whole body of the waters of the pond. As a consequence it is seen that in my improved pond, the fishes move freely about as the water is well aerated in all the compartments. By making the compartments square, or substantially square, the currents are centripetal and vertical, (as seen in Fig. 4,) whereas, if the compartments are oblong, they are each practically a straight pond, and there is no circuit of water-currents throughout the entire compartment.

By means of the aeration of the water by jets, discharged at comparatively short distances from each other, a water-supply which is variable or somewhat limited in quantity may nevertheless sufficiently support life, because all the water is so thoroughly aerated; and by experience I have found that on account of such improved aeration and the dissemination of air throughout the water, as described, a much larger number of fish can be grown in a given space than is possible under the usual conditions secured by the artificial ponds as heretofore constructed.

I am aware that it is not new to discharge jets of water into a tank or pond for pisciculture, but the air carried down into the water by such jets rises rapidly to the surface again. If the current in the pond is weak or if there is no current at all, the air-bubbles rise nearly perpendicularly and very near the place where the jet strikes the water; or if the current is strong and direct, they rise in a diagonal course down the stream according to the degree of the force and swiftness of the current. But in neither case is the air disseminated throughout the entire pond. In my improved device I produce, as already described, a rotary or centripetal current in each compartment, which sweeps over and through the entire area and body of water, and the air which is forced into the water of the pond by the water-jets under pressure, is given a rotary or spiral direction, so that the air-bubbles are longer submerged and are distributed over a greater space, thus perfectly aerating the water of the pond and vitalizing it to support the respiration of the fishes. The purpose of discharging the water by jets with pressure into the pond is to force air into the water of the pond for the purpose specified, but it is evident that the air may be introduced by other methods. Another advantage of said centripetal currents of water is that the food is better distributed than in a straight pond where the currents are direct.

I claim as a novel and useful invention and desire to secure by Letters Patent—

1. An artificial pond for fish culture, having a water-supply in combination with means of introducing and distributing air throughout the body of water therein, consisting of square compartments formed in said pond and having waterways alternately arranged to create centripetal currents in each compartment, respectively and a feed pipe from another water-supply under pressure, with gates or valves adapted to discharge the water by the force of gravity into such compartments, substantially as specified.

2. An artificial pond for fish culture, having a water-supply, in combination with means of forcing and distributing air throughout the body of water therein, consisting of square compartments formed in said pond and having waterways alternately arranged to create centripetal currents in each compartment, respectively, and a feed pipe from another water-supply, under pressure, with gates or valves, adapted to discharge the water into such compartments, substantially as specified.

3. In combination with an artificial fish pond having a flow of water through it and constructed with compartments having waterways alternately arranged, and a feed pipe from another water-supply under pressure, adapted to discharge water into said pond, so as to aerate the water of the pond, substantially as specified.

CHARLES A. HOXSIE.

Witnesses:
WARREN R. PERCE,
DANIEL W. FINK.